(12) United States Patent
McGowan et al.

(10) Patent No.: US 10,104,879 B2
(45) Date of Patent: Oct. 23, 2018

(54) INSECT CAPTURING DEVICE

(71) Applicant: KILLGERM GROUP LIMITED, Ossett, Yorkshire (GB)

(72) Inventors: Neil McGowan, Ossett (GB); Zaphod Leigh, Ossett (GB)

(73) Assignee: KILLGERM GROUP LIMITED, Ossett (GB)

( * ) Notice: Subject to any disclaimer, the term of this patent is extended or adjusted under 35 U.S.C. 154(b) by 181 days.

(21) Appl. No.: 15/114,335

(22) PCT Filed: Jan. 20, 2015

(86) PCT No.: PCT/GB2015/050121
§ 371 (c)(1),
(2) Date: Jul. 26, 2016

(87) PCT Pub. No.: WO2015/114310
PCT Pub. Date: Aug. 6, 2015

(65) Prior Publication Data
US 2017/0006847 A1    Jan. 12, 2017

(30) Foreign Application Priority Data
Jan. 28, 2014  (GB) .................................. 1401451.8

(51) Int. Cl.
*A01M 1/22* (2006.01)
*A01M 1/04* (2006.01)
*A01M 1/14* (2006.01)

(52) U.S. Cl.
CPC .............. *A01M 1/04* (2013.01); *A01M 1/145* (2013.01); *A01M 1/223* (2013.01)

(58) Field of Classification Search
None
See application file for complete search history.

(56) References Cited

U.S. PATENT DOCUMENTS

| 3,935,662 A | * | 2/1976 | Hamid | ..................... A01M 1/04 43/112 |
| 2002/0032980 A1 | * | 3/2002 | Nelson | ................... A01M 1/145 43/113 |

(Continued)

FOREIGN PATENT DOCUMENTS

| CN | 201115389 Y | 9/2008 |
| CN | 202122028 U | 1/2012 |

(Continued)

OTHER PUBLICATIONS

International Search Report and Written Opinion for PCT/GB2015/050121 filed Jan. 20, 2015 and mailed from the International Searching Authority dated Mar. 20, 2015, 10 pgs.

*Primary Examiner* — Richard G Davis
(74) *Attorney, Agent, or Firm* — Stoel Rives, LLP (57) ABSTRACT

An insect capturing device and a method of using the same. The insect capturing device includes a housing. The insect capturing device also includes an insect disabling portion. The insect capturing device also includes one or more light emitting diodes (LEDs) operable to emit light for attracting insects. The insect capturing device further includes a reflection surface. The LEDs are oriented to direct light onto the reflection surface for reflecting the light out from the housing to attract insects onto the insect disabling portion.

19 Claims, 6 Drawing Sheets

(56) References Cited

U.S. PATENT DOCUMENTS

| | | | |
|---|---|---|---|
| 2008/0229652 A1* | 9/2008 | Willcox | A01M 1/145 43/113 |
| 2009/0038207 A1* | 2/2009 | Lin | A01M 1/04 43/112 |
| 2009/0094883 A1* | 4/2009 | Child | A01M 1/023 43/112 |
| 2011/0041384 A1* | 2/2011 | Willcox | A01M 1/04 43/113 |
| 2012/0167450 A1 | 7/2012 | Frisch | |
| 2013/0312314 A1* | 11/2013 | Greening | A01M 1/145 43/114 |
| 2014/0026467 A1* | 1/2014 | Kaye | A61L 9/20 43/113 |
| 2016/0262367 A1* | 9/2016 | Sandford | A01M 1/145 |

FOREIGN PATENT DOCUMENTS

| | | |
|---|---|---|
| DE | 202006015719 U1 | 12/2006 |
| JP | S6455137 A | 3/1989 |
| KR | 101137413 B1 | 4/2012 |
| WO | 2006121346 A1 | 11/2006 |
| WO | 2007045879 A1 | 4/2007 |
| WO | 2009143471 A2 | 11/2009 |
| WO | 2013132230 A1 | 9/2013 |

\* cited by examiner

INSECT CAPTURING DEVICE

RELATED APPLICATIONS

This application is the U.S. National Stage filing under 35 U.S.C. 371 of International Patent Appilcation PCT/GB2015/050121, filed on Jan. 20, 2105 and titled INSECT CAPTURING DEVICE, which claims the benefit of Great Britain Patent Application No. 1401451.8, filed on Jan. 28,2014 and titled INSECT CAPTURING DEVICE, each of which is incorporated herein by reference in its intirety.

FIELD OF THE INVENTION

This invention relates to an insect capturing device.

BACKGROUND OF THE INVENTION

Known insect capturing devices typically use UV light having a wavelength approximately in the range 300 nm ≥λ≥400 nm to attract insects onto an insect disabling portion such as a glue board or a high voltage killing grid provided within a housing. The UV light is produced using a fluorescent tube.

For example, WO 2012/104598 A1 describes an insect catching device which comprises a housing. A radiation source which attracts insects is mounted inside the housing and an insect catching member is located within the housing. The insect catching member has a catching surface on which an amount of an adhesive material is provided. The front portion of the housing defines an aperture which allows insects to enter the housing and be caught on the adhesive material. The housing defines a vent located separately from the aperture and positioned to create an airflow into the housing by convection resulting from the heat generated by the radiation source during use of the device.

In another example, U.S. 2003/0089023 describes an insect trap using attractant light displayed on a projection surface. The insect trap can be mounted on a vertical surface or on a ceiling surface. The wall-mounted housing forms an upwardly facing opening for facilitating entry of flying insect pests and for the reflection of light onto the vertical surface. The ceiling-mounted housing has a lateral opening for facilitating entry of pests and for reflection of light onto the ceiling and/or opposite wall. Insects that enter the trap are immobilized on an adhesive surface within the trap.

SUMMARY OF THE INVENTION

Aspects of the invention are set out in the accompanying independent and dependent claims. Combinations of features from the dependent claims may be combined with features of the independent claims as appropriate and not merely as explicitly set out in the claims.

According to an aspect of the invention, there is provided an insect capturing device. The insect capturing device includes a housing. The insect capturing device also includes first and second reflection surfaces. The insect capturing device further includes an insect disabling portion located in between the first and second reflection surfaces. The insect capturing device also includes one or more light emitting diodes (LEDs) operable to emit light for attracting insects. The insect capturing device further includes a reflection surface. The LEDs are oriented so that light emitted by the LEDs does not leave the housing directly. The LEDs are oriented to direct light onto the reflection surface for reflecting the light out from the housing to attract insects onto the insect disabling portion. The light reflected out from the housing by the first reflection surface is directed across the insect disabling portion in a first direction. The light reflected out from the housing by the second reflection surface is directed across the insect disabling portion in a second direction, thereby to create a region in front of the housing in which insects are attracted inward towards the insect disabling portion.

Improvements in the technology of high quality LEDs can enable them to exceed the energy efficiency of traditional fluorescent tubes. Fluorescent tubes also use mercury and their construction and subsequent disposal is not considered to be environmentally friendly. This is compounded by the fact that fluorescent tubes have a relatively short lifetime and frequently need to be replaced (e.g. annually, which can be compared with the lifetime of a typical LED which may be substantially longer).

Although it may be desirable to use LEDs in an insect capturing device for the reasons noted above, it has been found that the intense direct light emitted from LEDs is less effective in attracting insects. Embodiments of this invention can allow this problem to be solved by providing a reflection surface from which light emitted from LEDs can be reflected out from the housing of the device.

LEDs, particularly SMD LEDs, can produce intense light which can cause temporary or permanent eye and skin damage in a person exposed to the insect capturing device. This problem is solved by preventing light emitted by the LEDs from leaving the housing directly. In some embodiments, the majority of the light produced by the LEDs leaves the housing of the device via the reflection surface.

The insect disabling portion is located in between the reflection surfaces. Light reflected out from the housing by each reflection surface can be directed across the insect disabling portion. The effect of this is to create a region in front of the housing within which insects are attracted inward towards the insect disabling portion located toward the center of the arrangement.

In one embodiment, the reflection surface is located on an interior surface of the housing adjacent the insect disabling portion. Locating the reflection surface adjacent the insect disabling portion can improve the rate at which insects, attracted by the light reflected from the reflection surface, land on the insect disabling portion.

According to an embodiment of the invention, the reflection surface can be configured to diffuse the light reflected out from the housing. It has been found that insects are particularly attracted to diffuse light, so that diffuse light reflected out from the housing improves the effectiveness with which insects are attracted onto an insect disabling portion. Additionally, by diffusing the reflected light, potential damage to the eyes of a person looking at the reflection surface can be prevented. In one embodiment, the reflection surface can be an anodised metal surface. For example, matt anodised aluminium can be used.

The reflection surface can be substantially flat. Alternatively, the reflection surface may be curved.

The reflection surface can be located next to the insect disabling portion on a common surface of a panel located within the housing. In another example, the reflection surface can be located behind the insect disabling portion for example behind a high voltage killing grid. In a further example, the reflection surface can itself form at least a part of the insect disabling portion. For instance the reflection surface can comprise a set of reflective plates that act as electrodes to form a high voltage killing grid. In yet a further example, the reflection surface can be located on the insect disabling portion, for example as a reflection surface mounted on a glue board.

In one embodiment, the LEDs can be oriented inwardly with respect to the housing so that light emitted by the LEDs does not leave the housing directly.

The LEDs may be oriented in the range from 100° to 170°, preferably from 110° to 160°, more preferably from 120° to 150°, especially preferably from 130° to 140° with respect to a surface nonnal n of the reflection surface.

In one embodiment, a reflector can be included for directing light emitted by the LEDs onto the reflection surface. In this way, the amount of stray light falling upon a glue board that may be received in the insect disabling portion can be reduced. Light falling on the glue board can otherwise lead to drying of the glue, reducing the effectiveness of the board in capturing insects that land upon it. The reflector can also act to concentrate the light produced by the LEDs onto the reflection surface, thereby maximising the light reflected out from the housing. The reflector can further act to prevent stray light emitted by the LEDs from leaving the housing of the device directly, which can otherwise lead to eye or skin damage in a person exposed to the insect capturing device. The reflector can, for example, be a reflector cone such as a parabolic reflector cone.

In one embodiment, a barrier can be positioned between the insect disabling portion and the reflection surface, again for reducing the amount of light emitted by the LEDs that falls on a glue board that may be received in the insect disabling portion.

In one embodiment, more than two reflection surfaces can be provided. The insect disabling portion can be located in between the reflection surfaces. Light reflected out from the housing by each reflection surface can be directed across the insect disabling portion. The effect of this is to create a region in front of the housing within which insects are attracted inward towards the insect disabling portion located toward the center of the arrangement.

According to an embodiment of the invention, the LEDs can be surface-mounted devices (SMDs). LEDs of this kind generally have higher output power, higher power density, and have a lower cost per Watt of output power than through-hole bulb LEDs. While SMD LEDs typically use a glass lens, through-hole bulb LEDs use an epoxy coating that can degrade over time (particularly when light in the UV spectrum is used). SMD LEDs often have a wide viewing angle. This can make it difficult to extract the light emitted from a SMD LED from the insect capturing device. However, this problem can be solved using the focusing and reflection techniques described herein. Since SMD LEDs can produce a large amount of heat, one or more heat sinks in thermal contact with the housing and the LEDs can be used. The heat sink(s) may be provided with fins to aid in the dissipation of heat to the surrounding environment.

The insect disabling portion can be implemented as, for example, a glue board receiving space. In an alternative embodiment, the insect disabling portion can include one or more electrodes to which a high voltage (e.g. a few kV) can be applied. It is also envisaged that the insect disabling portion may include a combination of features such as a glue board receiving space in addition to one or more electrodes.

According to another aspect of the invention, there is provided a method for capturing insects. The method includes providing an insect capturing device of the kind described above, the insect capturing device having an insect disabling portion. The method also includes operating the LEDs to emit light for attracting insects.

According to an embodiment of the invention, where the insect disabling portion comprises a glue board receiving space, the method can further include replacing a glue board received in the glue board receiving space. The glue board can be replaced at regular intervals (e.g. weekly, monthly) or can be replaced as and when the board has been filled with insects or impaired by the accumulation of dust.

BRIEF DESCRIPTION OF THE DRAWINGS

Embodiments of the present invention will be described hereinafter, by way of example only, with reference to the accompanying drawings in which like reference signs relate to like elements and in which.

DETAILED DESCRIPTION

Embodiments of the present invention are described in the following with reference to the accompanying drawings.

Figure 1:
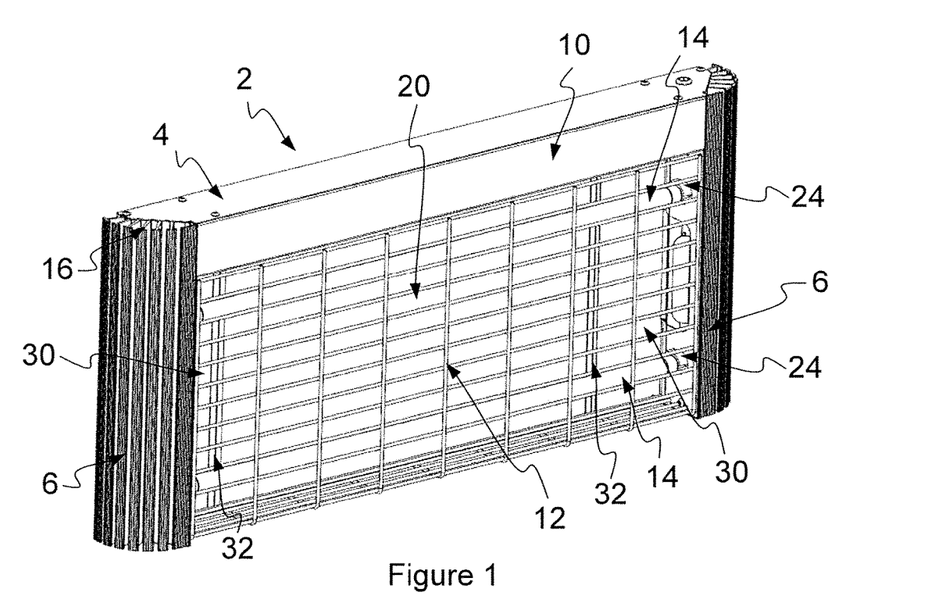
FIG. 1 shows an insect capturing device in accordance with an embodiment of the invention.

FIG. 1 illustrates an insect capturing device 2 in accordance with an embodiment of the invention. The insect capturing device includes a housing 10. The housing 10 forms an enclosure that contains various components of the device 2 such as one or more light emitting diodes 40 and an insect disabling portion 20 as will be described in greater detail below. The housing 10 in this example includes a top section 4, a grille 12 which is provided at the front of the housing 10, a back section 8 (see FIGS. 4-7) and two side portions, which in this embodiment are provided in the form of heat sinks 6 including a plurality of heat sink fins 16. The features of the housing 10 of the insect capturing device can be constructed using any suitable material. In the present example, metals such as aluminium or stainless steel have been used.

In FIG. 1, the grille 12 is shown in a closed position. The grille 12 allows insects that are attracted to the insect capturing device 2 to enter the housing 10 and land on an insect disabling portion 20 located therein. The grille 12 also allows light produced by one or more LEDs and/or fluorescent tubes provided within the housing 10 to exit the housing 10 (typically through the grille 12) to attract insects.

In the present example, the insect capturing device 2 is wall mountable. Features such as hooks or pegs or holes for screws can be provided to mount the device on a wall. In this example, the insect capturing device 2 is provided with a mounting feature 50 incorporating a slot 52 on the back portion 8 for receiving a screw or nail located on a wall (see FIGS. 5 to 8).

Figure 2:
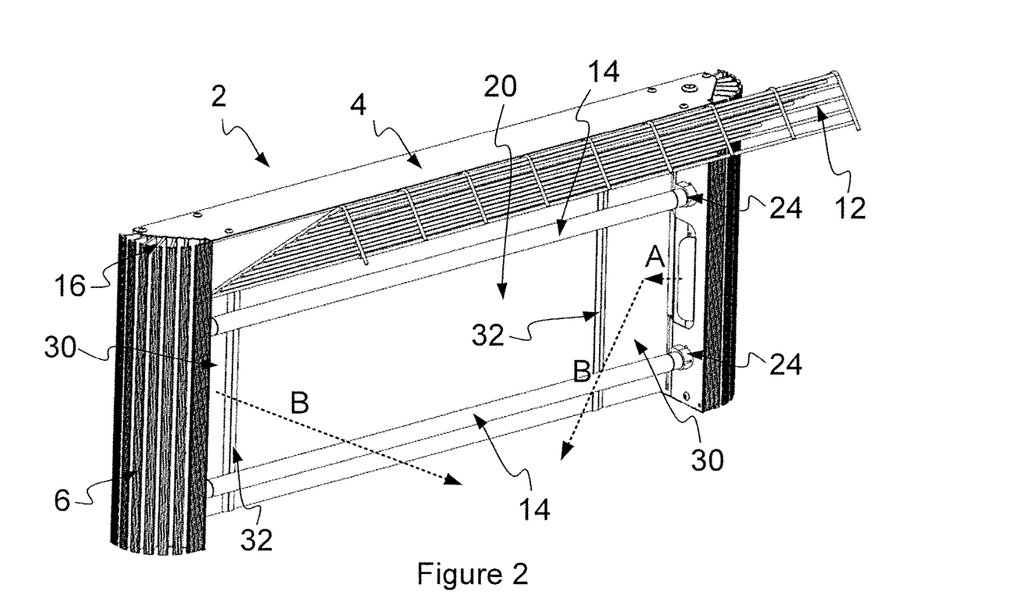
FIG. 2 shows the insect capturing device of FIG. 1 with the front grille in an open position.
Figure 3:
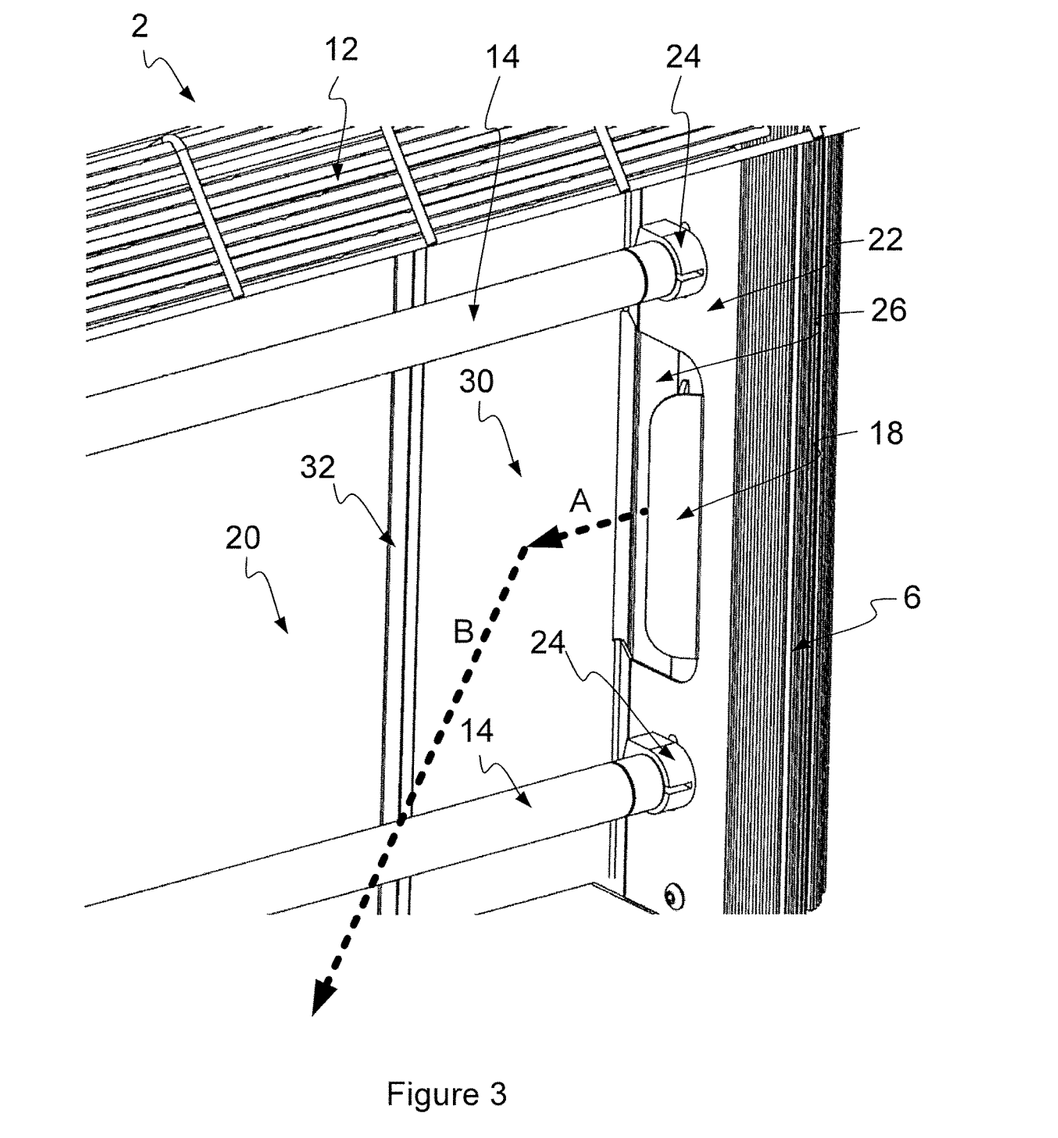
FIG. 3 shows a close up view of the arrangement of an insect disabling portion and a reflection surface comprised in an insect capturing device in accordance with an embodiment of the invention.
Figure 4:
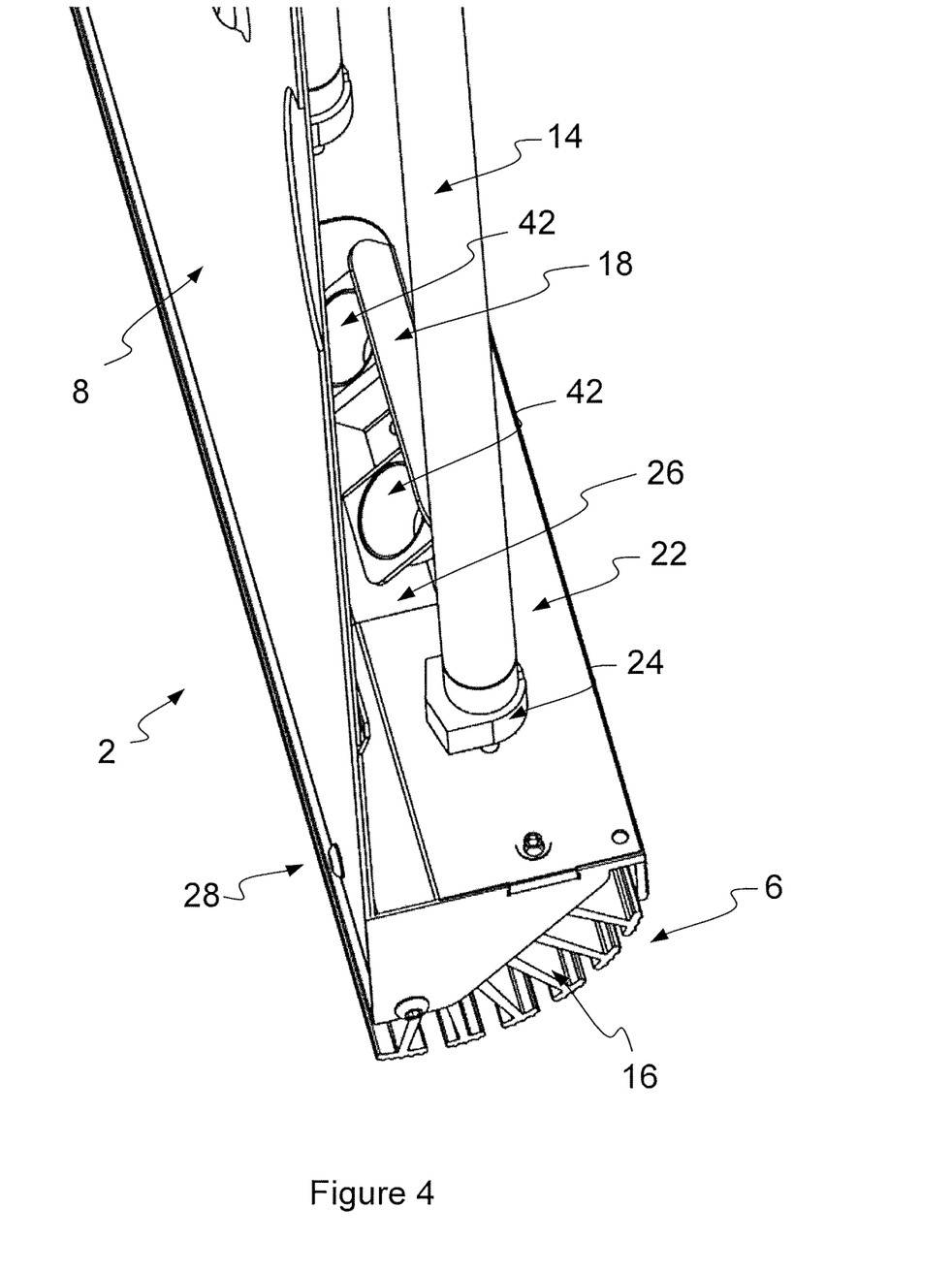
FIG. 4 shows the arrangement of one or more light emitting diodes (LEDs) in an insect capturing device in accordance with an embodiment of the invention.

FIG. 2 shows the insect capturing device 2 of FIG. 1 with the grille 12 in an open position. The grille 12 can, for example, be pivoted at one end to allow it to swing away from the remainder of the housing 10, thereby to allow access to the interior of the housing 10. This can, for example, allow replacement of a glue board (see below) or other components such as the LEDs described below and/or any fluorescent tubes 14 located within the housing 10. Additionally, opening the grille 12 can allow access to the interior of the housing 10 for cleaning.

In the present example, the insect capturing device 2 is provided with one or more fluorescent tubes 14, which can be conventional in nature. The fluorescent tubes 14, where provided, can be located within housing 10 and installed within sockets 24. However, these fluorescent tubes 14 are provided merely to supplement the light provided by the LEDs described below and are not considered to be essential to this invention. Accordingly, in alternative embodiments, insect capturing devices having no fluorescent tubes 14 may be provided and in such cases insects are attracted to the insect capturing device 2 purely by the light emitted from the LEDs.

The insect capturing device 2 includes an insect disabling portion 20. In the present example, the insect disabling portion 20 comprises a glue board receiving space. The glue board receiving space can be a generally flat area provided on an interior surface of the housing 10 within which a glue board can be inserted. Glue boards are well known in the field of insect capturing devices and typically comprise a sheet of material such as plastic or cardboard covered with a sticky substance. Insects that land on the glue board are caught on the surface of the glue board. Generally, glue boards of this kind need to be replaced on a semi-regular basis (for example, monthly or quarterly). One or more clips, slots, or other fastening devices can be provided within the housing 10 for attaching a glue board to the glue board receiving space of the insect disabling portion 20.

In alternative embodiments, the insect disabling portion 20 can take other forms. For example, the insect disabling portion 20 can comprise one or more electrodes across which a high voltage can be applied. The electrodes can be arranged in the form of a grid. Insects landing on the electrodes are killed by an electrical current passing through the insect, between the electrodes. Insect disabling portions incorporating electrodes of this kind are well known in the field of insect capturing devices and accordingly will not be elaborated upon further herein. It is further noted that a combination of one or more glue boards and/or electrodes (or indeed other kinds of insect disabling features) can be included in the insect disabling portion 20.

In accordance with an embodiment of this invention, the insect capturing device 2 includes a reflection surface 30. In the present example, the insect capturing device 2 includes first and second reflection surfaces 30. These reflection surfaces 30 are provided on either side of the insect disabling portion 20, as best shown in FIG. 2. The reflection surfaces 30 are provided to reflect light emitted by one or more LEDs of the insect capturing device 2 out through the housing 10 of the insect capturing device 2. In the present example, the reflected light passes through the grille 12 to attract insects which can then enter the housing 10 through the grille 12 to be captured by the insect disabling portion 20.

As is schematically illustrated in FIGS. 2, 3, 5 and 8, light emitted by the one or more LEDs is incident upon the reflection surfaces 30 as indicated by the dashed arrows labelled 'A'. The reflected light is schematically illustrated in the figures by the dashed arrows labelled 'B'. In the present example, since two reflection surfaces 30 are provided, it will be appreciated that in the present example, light is reflected outwards from the front of the housing 10 through the grille 12 in more than one direction. This is best illustrated in FIG. 2. It is thought that this arrangement can form a catchment area in front of the insect capturing device 2 within which insects are attracted inwards into the insect capturing device through the grille 12. It is envisaged that in some examples a single reflection surface 30 may be provided.

In the present embodiment the insect disabling portion 20 comprises a glue board receiving space for receiving a glue board. Since light emitted by the LEDs can lead to drying of the sticky substance on the surface of the glue board, it is beneficial to take steps to prevent light that emitted by the LEDs from falling on a glue board in the glue board receiving space. This can be achieved in a number of ways. As described further below, means such as reflectors 42 can be provided to channel and/or focus the LED light onto the reflection surfaces 30. Additionally, and as best shown in FIGS. 2, 3, 5 and 8, a barrier 32 can be positioned between the insect disabling portion and the reflection surface. The barrier 32 can take the form of a lip or flange that extends outwardly from a position at the side of the reflection surface closest to the insect disabling portion 20 to block any stray light emitted by the one or more LEDs. The barrier can also form at least part of the means for retaining the glue board in the glue board receiving space.

FIGS. 3 to 8 best illustrate the arrangement and position of the LEDs 40 of the insect capturing device 2. In this example, a plurality of LEDs 40 are provided at each side of the housing 10. The LEDs 40 can be oriented inwards with respect to the housing 10 so that no light emitted by the LEDs 40 can leave the housing 10 directly. Light emitted by the LEDs 40 as indicated by the dashed arrows labelled 'A' generally can only leave the housing 10 by reflection from the reflection surfaces 30. In one embodiment, the LEDs 40 are oriented toward the center of the reflection surfaces 30.

In this embodiment, the LEDs 40 are situated within side sections of the housing 10, behind a side plate 22. In this example, the side plate 22 has an opening 26 that allows light emitted by the LEDs 40 to pass therethrough, to fall on the reflection surfaces 30. In some examples, a blind 18 can be positioned over the LEDs 40 to prevent stray light from the LEDs 40 or their reflectors 42 leaving the housing 10 directly.

In some examples, the LEDs 40 can be provided with features for concentrating or focussing the light that they emit onto the reflection surface 30. In the present embodiment, the LEDs 40 are each provided with a reflector 42 for this purpose. The reflectors 42 can be provided in the form of cones having, for example, a parabolic cross-section. An inner surface of the cone 42 can be provided a reflective surface so that light falling thereon is reflected towards the reflection surface 30. The reflectors can, for example, comprise aluminium. Note that the reflectors 42 can also act as a shroud around the LEDs, to shield the LEDs against direct emission of light from the housing 10.

Figure 5:
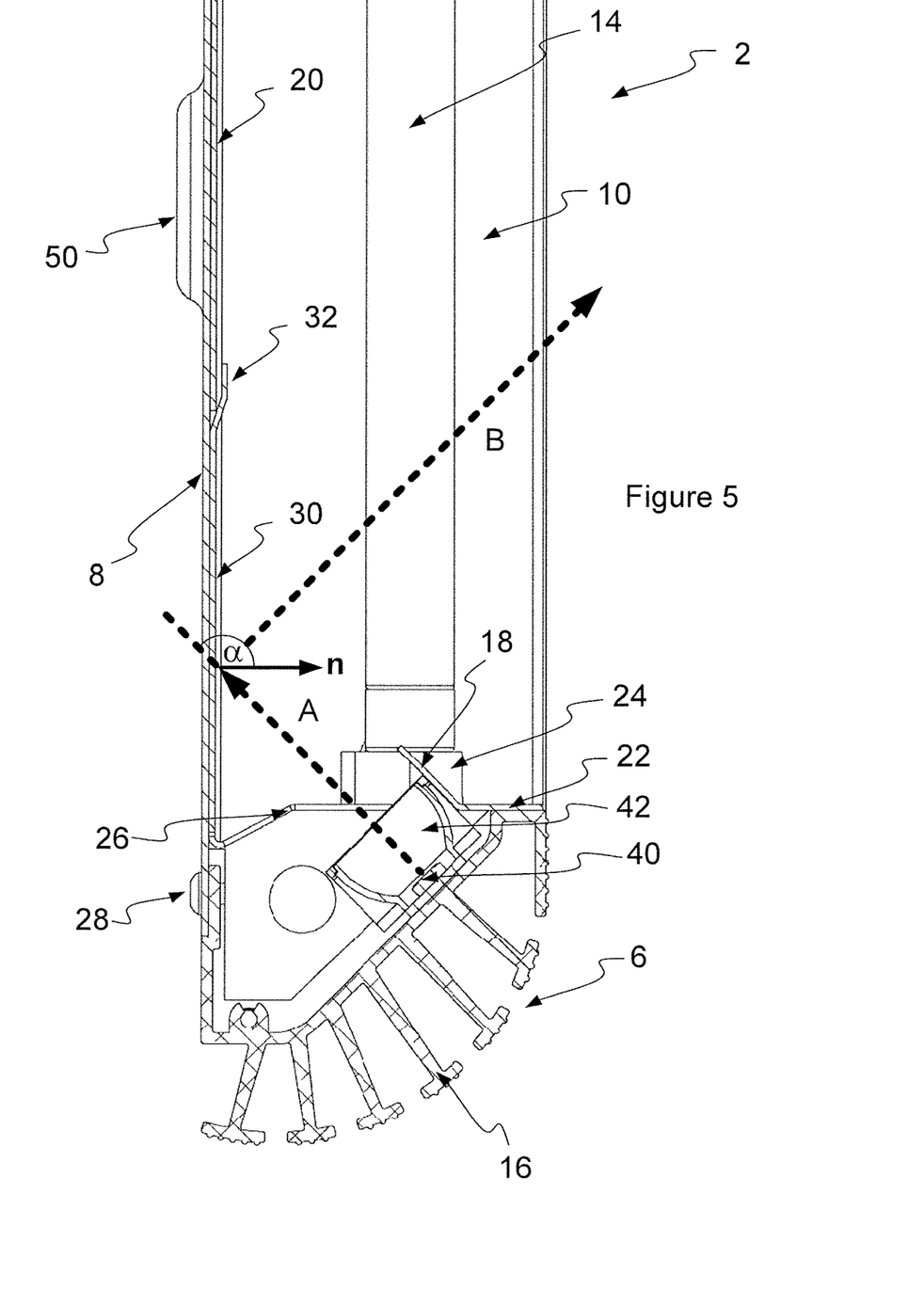
FIG. 5 shows a cross section of an insect capturing device in accordance with an embodiment of the invention.
Figure 6:
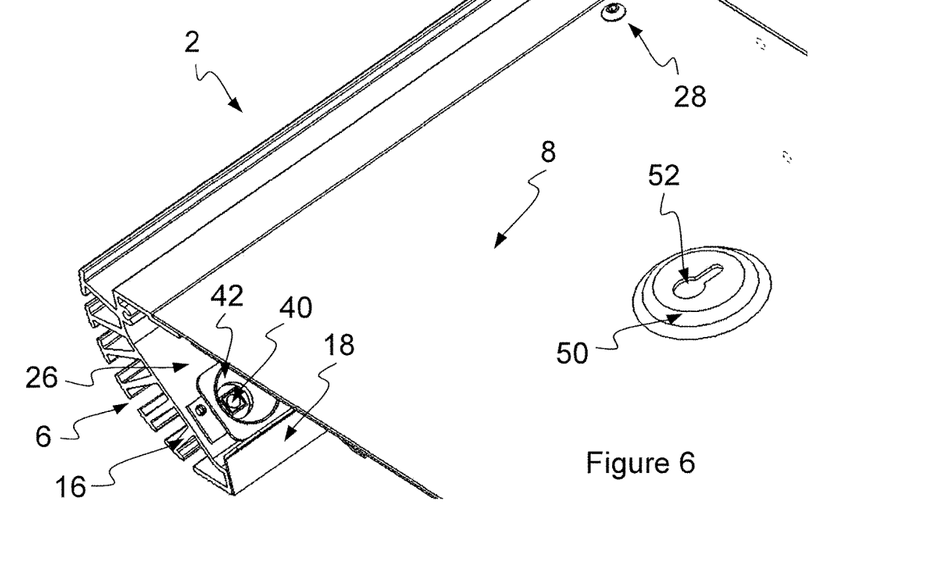
FIGS. 6 to 8 each show cut-away views of an insect capturing device in accordance with an embodiment of the invention.
Figure 7:
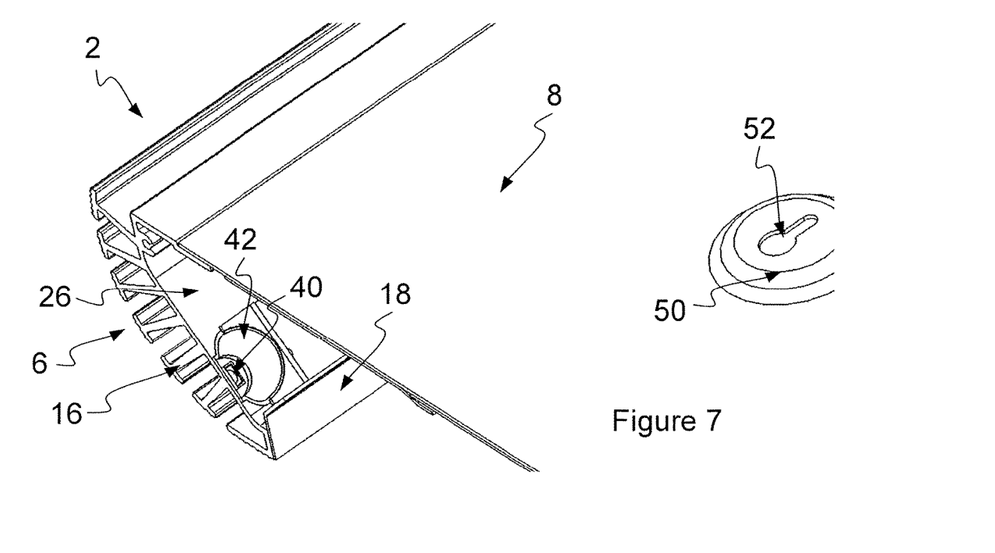

FIG. 5 is a cross-section of the insect capturing device 2 through one of the LEDs 40, its respective reflector 42 and various other features of the device 2. FIG. 5 illustrates the orientation of the LEDs towards the reflection surface 30 so that light emitted is directed generally along the dashed arrow labelled 'A'. The angle of incidence of peak intensity of light emitted by the LEDs 40 falling on the reflection surface 30 is indicated by the angle $\alpha$ with respect to a surface normal n of the reflection surface 30. Typically, this angle is in the range from $100° \leq \alpha \leq 170°$, preferably from $110° \leq \alpha \leq 160°$, more preferably from $120° \leq \alpha \leq 150°$, especially preferably from $130° \leq \alpha \leq 140°$ with respect to a surface normal n of the reflection surface. It will be appreciated however, that light emitted by the LEDs and their reflectors 42 will be incident on the reflection surfaces across a range of angles.

In accordance with an embodiment of this invention, the parabolic reflector cone can concentrate the light such that the majority of the light emitted by the LEDs 40 hits the reflection surfaces 30 and is reflected in a manner that causes the majority of the light to be effectively extracted from the insect capturing device 2. Using a reflector in this manner allows the system to have a small form factor that does not occupy a significant amount of lateral or vertical space.

The LEDs used can be selected according to criteria such as their output power and emission spectrum. Traditionally, fluorescent tubes used in insect capturing devices operated at around 350 nm, although nowadays tubes operating at around 365 nm are almost always used. Accordingly, the LEDs provided in an insect capturing device according to an embodiment of this invention may operate at or around these wavelengths. It has also been found that most insects are also sensitive to light at somewhere around 500 nm (Gary D. Bernard and Doekele G. Stavenga, "Spectral Sensitivities of Retinular Cells Measured in Intact, Living Flies by an Optical Method", J. Comp. Physiol. 134, 95-107 (1979)). Accordingly, it is envisaged that LEDs operating at or around this wavelength could be used.

Figure 8:
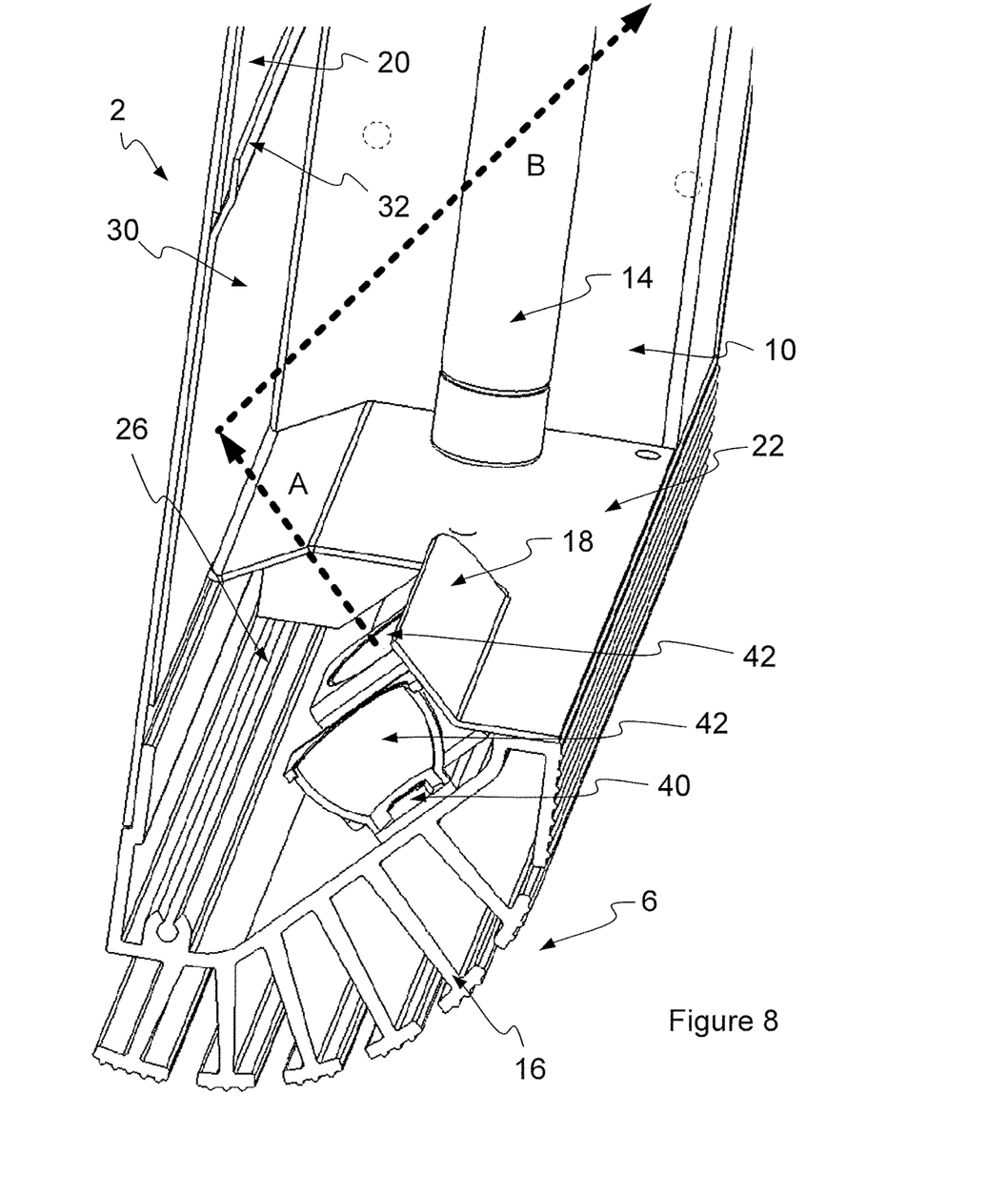

As can best be seen from FIGS. 5 and 8, light reflected (see the dashed arrow labelled 'B') from the reflection surfaces 30 exits the housing 10 at an angle similar to the angle of incidence. In accordance with an embodiment of the invention, the reflection surfaces 30 can be configured to diffuse the reflected light. This has the advantage of preventing concentrated, reflected light from the LEDs 40 from exiting the housing 10, thereby preventing problems such as those noted above relating to eye or skin damage in a person exposed to the insect capturing device 2. In addition to this, it has been found that insects are particularly attracted to diffuse light in the UV range. The reflection surfaces 30 can, for example, comprise an anodised metallic material for providing a suitable surface for diffuse reflection of the LED light. In the present example, matt anodised aluminium is used.

As is most clearly seen in FIGS. 5 to 8, the heat sink 6 incorporating a plurality of fins 16 for dissipating heat is provided in thermal communication with the one or more LEDs 40. Typically, devices such as surface mount device LEDs (SMD LEDs) can produce a relatively large amount of heat during operation. The heat sinks 6 can act to dissipate this heat effectively, thereby to prevent overheating. The heat sinks 6 and their associated fins 16 can comprise a different material to the remainder of the housing 10. For example, the fins 16 can comprise a material having a higher thermal conductivity than the material used for the remainder of the housing, thereby to enhance the operation of the heat sinks 6 to dissipate heat produced by the LEDs 40.

As noted above, in some embodiments, the LEDs can be surface mounted devices (SMDs). LEDs of this kind are less prone to ageing, particularly for applications relating to insect capturing devices, since they generally have higher output power, higher power density and have a lower cost per watt of output power than through-bulb LEDs. Through-bulb LEDs also typically include an epoxy coating which can degrade (become cloudy) over time, particularly when exposed to light in the UV spectrum.

In this embodiment, each SMD LED 40 is soldered onto a MCPCB (Metal-Core Printed Circuit Board), which is screwed onto the heat sink 6 via a thermal interface material such as a thermal grease. The heat sink 6 in this embodiment is attached to the back section 8 of the housing 10 using screws 28 or other means.

Where a metallic reflector 42 is used (e.g. aluminium), a PTFE (Polytetrafluoroethylene) washer can be used to insulate the aluminium cone from the solder joints of the LED terminals on the MCPCB. A hollow channel in the washer can allow the wires from the MCPCB to be routed to an LED driver.

In the present example, the insect capturing device 2 is provided with four LEDs 40 and respective reflectors 42. Two LEDs 40 are provided on either end of the insect capturing device 2 for producing light that will fall upon and be reflected outwardly by the respective reflection surfaces 30. The reflection surfaces 30 of the insect capturing device 2 are, in the present example, provided on an interior surface of the housing 10. In the present example, each reflection surface 30 is substantially flat and is located in a plane parallel to the plane of the glue board receiving space of the insect disabling portion 20. In alternative embodiments, the reflection surfaces 30 can be curved to allow light falling thereon to be concentrated to some degree, as it passes out of the grille 12.

In accordance with embodiments of this invention, insects can be captured by providing an insect capturing device of the kind described herein and operating the LEDs to emit light for attracting insects. Over time, it may prove necessary to replenish or replace one or more features of the insect disabling portion 20 such as a glue board. Accordingly, a method according to an embodiment of the invention can include replacing a glue board provided in the insect disabling portion 20 with a replacement glue board. As part of the method, the grille 12 can be pivoted upwards to reveal the interior of a housing 10 to allow access to a glue board receiving space of the insect disabling portion 20.

Accordingly, there has been described an insect capturing device and a method of using the same. The insect capturing device includes a housing. The insect capturing device also includes an insect disabling portion. The insect capturing device also includes one or more light emitting diodes (LEDs) operable to emit light for attracting insects. The insect capturing device further includes a reflection surface. The LEDs are oriented to direct light onto the reflection surface for reflecting the light out from the housing to attract insects onto the insect disabling portion.

Although particular embodiments of the invention have been described, it will be appreciated that many modifications/additions and/or substitutions may be made within the scope of the claimed invention.

The invention claimed is:

1. An insect capturing device comprising:
   a housing;
   first and second reflection surfaces;
   an insect disabling portion located in between the first and second reflection surfaces; and
   one or more light emitting diodes (LEDs) operable to emit light for attracting insects;
   wherein the LEDs are oriented inwardly with respect to the housing so that light emitted by the LEDs does not leave the housing directly, wherein the LEDs are oriented to direct light onto the reflection surface for reflecting said light out from the housing to attract insects onto the insect disabling portion, wherein the light reflected out from the housing by the first reflection surface is directed across the insect disabling portion in a first direction, and wherein the light reflected out from the housing by the second reflection surface is directed across the insect disabling portion in a second direction, thereby to create a region in front of the housing in which insects are attracted inward towards the insect disabling portion.

2. The insect capturing device of claim 1, wherein each reflection surface is located on an interior surface of the housing adjacent the insect disabling portion.

3. The insect capturing device of claim 1, wherein each reflection surface is configured to diffuse the light reflected out from the housing.

4. The insect capturing device of claim 3, wherein each reflection surface comprises a matt anodised metal surface.

5. The insect capturing device of claim 1, wherein each reflection surface is substantially flat.

6. The insect capturing device of claim 1, wherein each reflection surface is curved.

7. The insect capturing device of claim 1, wherein the LEDs are oriented at an angle in the range from 100° to 170° with respect to a surface normal n of each reflection surface.

8. The insect capturing device of claim 1, further comprising a reflector for directing light emitted by the LEDs onto each reflection surface.

9. The insect capturing device of claim 8, wherein the reflector comprises a reflector cone.

10. The insect capturing device of claim 1 comprising a barrier positioned between the insect disabling portion and each reflection surface for preventing light emitted by the LEDs from falling on a glue board received in the insect disabling portion.

11. The insect capturing device of claim 1, wherein the LEDs comprise surface-mounted devices (SMDs).

12. The insect capturing device of claim 11 comprising one or more heat sinks in thermal contact with the housing and the LEDs.

13. The insect capturing device of claim 1, wherein the insect disabling portion comprises a glue board receiving space.

14. The insect capturing device of claim 1, wherein the insect disabling portion comprises one or more electrodes.

15. The insect capturing device of claim 1, wherein the LEDs are oriented at an angle in the range from 110° to 160° with respect to a surface normal n of each reflection surface.

16. The insect capturing device of claim 1, wherein the LEDs are oriented at an angle in the range from 120° to 150 with respect to a surface normal n of each reflection surface.

17. The insect capturing device of claim 1, wherein the LEDs are oriented at an angle in the range from 130° to 140° with respect to a surface normal n of each reflection surface.

18. A method for capturing insects, the method comprising:
   providing an insect capturing device, the insect capturing device comprising:
      a housing;
      first and second reflection surfaces;
      an insect disabling portion located in between the first and second reflection surfaces; and
      one or more light emitting diodes (LEDs) operable to emit light for attracting insects;
      wherein the LEDs are oriented inwardly with respect to the housing so that light emitted by the LEDs does not leave the housing directly, wherein the LEDs are oriented to direct light onto the reflection surface for reflecting said light out from the housing to attract insects onto the insect disabling portion, wherein the light reflected out from the housing by the first reflection surface is directed across the insect disabling portion in a first direction, and wherein the light reflected out from the housing by the second reflection surface is directed across the insect disabling portion in a second direction, thereby to create a region in front of the housing in which insects are attracted inward towards the insect disabling portion; and
   operating the LEDs to emit light for attracting insects.

19. The method of claim 18 further comprising replacing a glue board provided in the insect disabling portion with a replacement glue board.

* * * * *